April 13, 1937.  A. JASMIN  2,077,109

TOOL HOLDER

Filed Jan. 22, 1936  2 Sheets-Sheet 1

INVENTOR.
Armand Jasmin.

BY

Chas. E. Townsend.
ATTORNEY.

April 13, 1937.  A. JASMIN  2,077,109
TOOL HOLDER
Filed Jan. 22, 1936  2 Sheets-Sheet 2
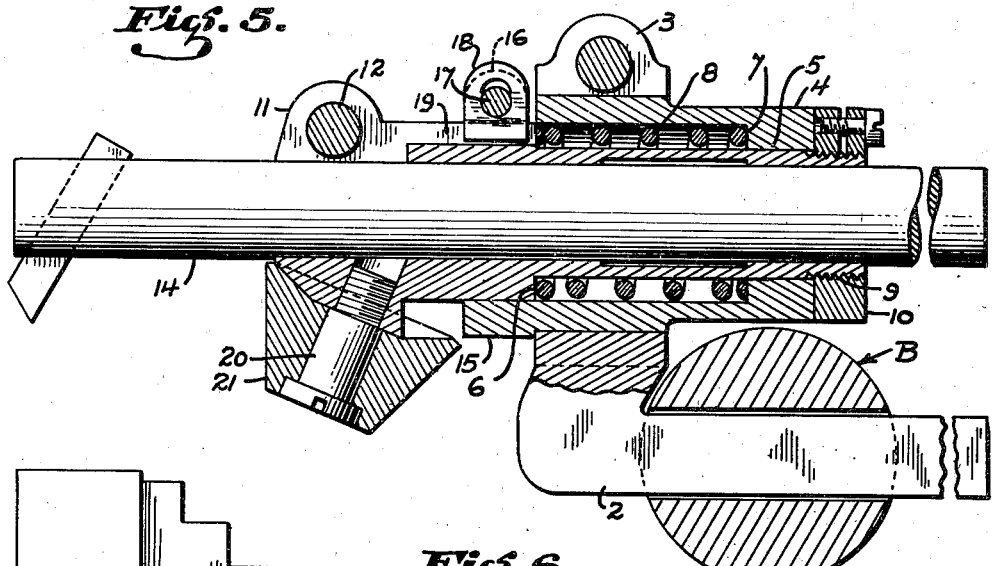
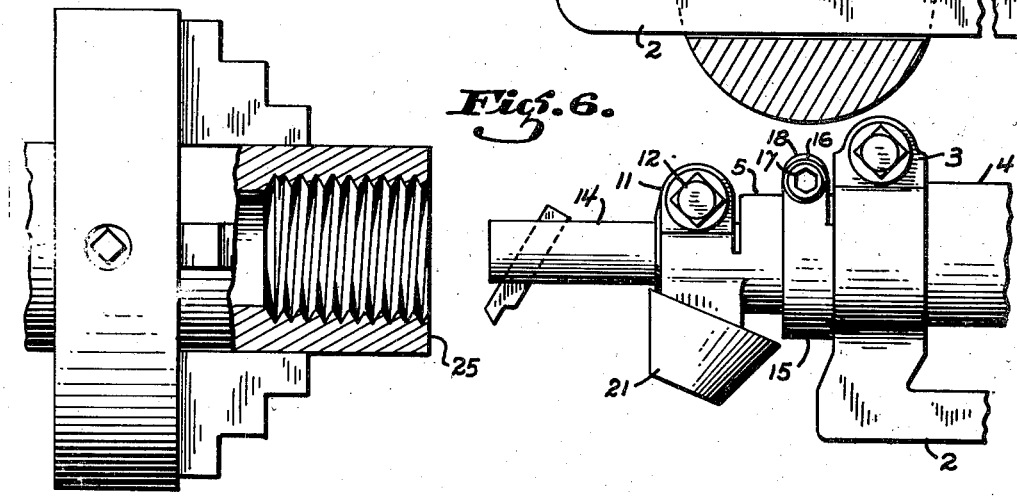
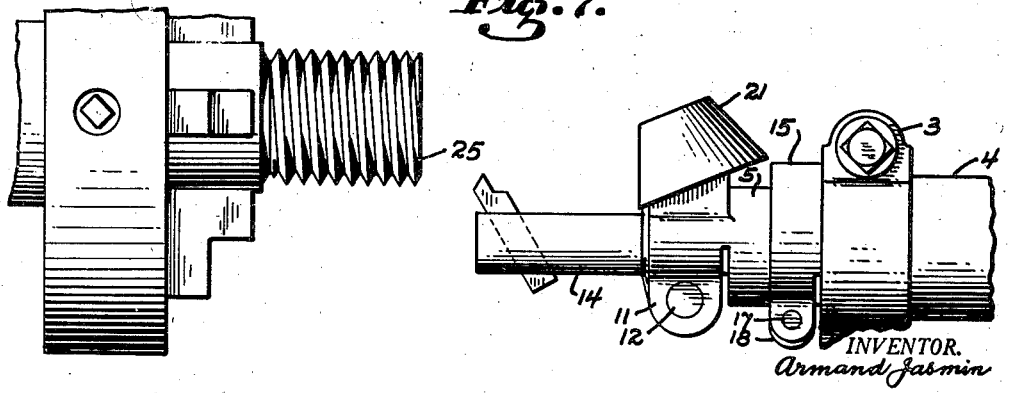
INVENTOR.
Armand Jasmin
BY
Chas. E. Townsend.
ATTORNEY.

Patented Apr. 13, 1937

2,077,109

UNITED STATES PATENT OFFICE 2,077,109

TOOL HOLDER

Armand Jasmin, San Francisco, Calif.

Application January 22, 1936, Serial No. 60,243

2 Claims. (Cl. 29—99)

This invention relates to a tool holder for lathe tools and the like, and especially to a tool holder in which the tool is resiliently mounted for endwise movement.

The object of the present invention is to generally improve and simplify the construction and operation of tool holders of the character described; to provide means for stopping the feed of the cutting tool independently of the carriage or tool holder feed at any given position so that the cut made by the tool can be stopped instantly and accurately at any predetermined point on the work; to provide a visible warning to indicate to the lathe operator when the tool has completed its cut; and, further, to provide a tool holder which will substantially reduce breakage of tools and damage to the material being worked upon and which will permit a material speeding up of the work and increased output by the lathe handler or operator.

The tool holder is shown by way of illustration in the accompanying drawings, in which—

Fig. 5 is a longitudinal plan section of the tool holder, said view also showing the boring bar secured in the tool holder and the clamp whereby the tool holder is secured to the tool post;

Figs. 6 and 7 are diagrammatic views showing different types of work to which the tool holder is adapted.

Figure 1:
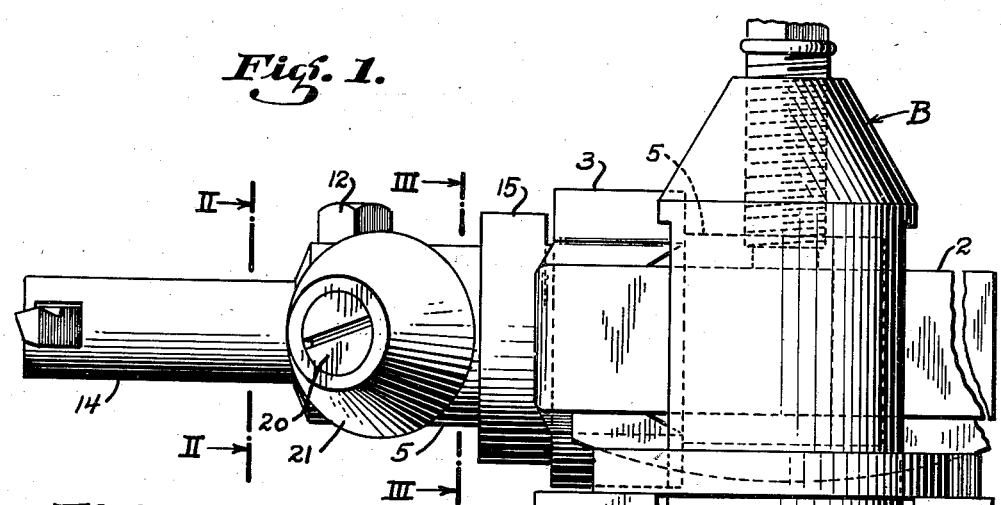
Fig. 1 is a side elevation of the compound rest or carriage of an engine lathe, said view also showing a standard form of tool post and the tool holder supported thereby.
Figure 2:
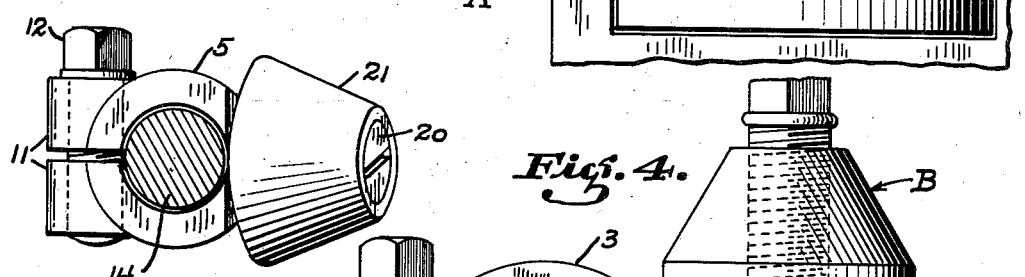
Fig. 2 is a cross section taken on line II—II of Fig. 1.
Figure 4:
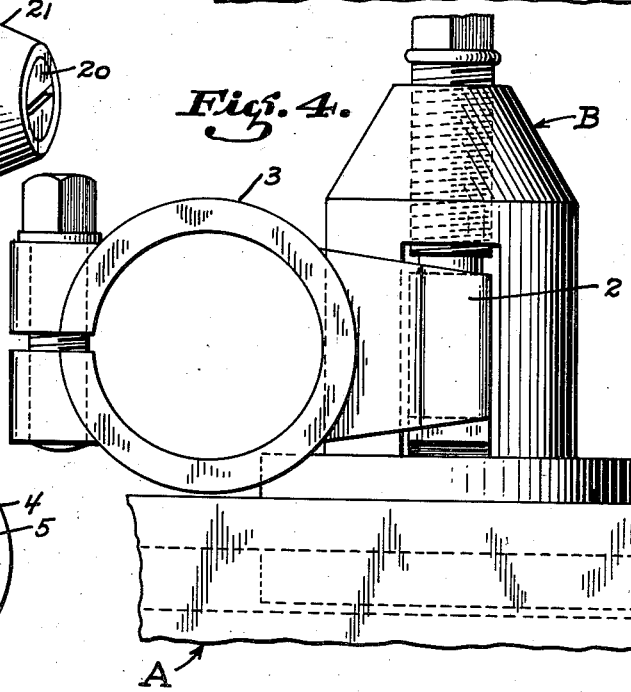
Fig. 4 is an end view of the carriage tool post and the clamp whereby the tool holder is secured.
Figure 3:
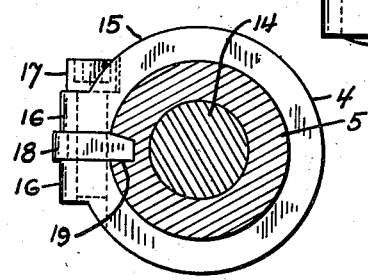
Fig. 3 is a cross section on line III—III of Fig. 1.

Referring to the drawings in detail, and particularly Fig. 1, A indicates the upper portion of a compound rest or carriage of an engine lathe, and B the tool post mounted thereon. Secured in the tool post in the usual manner is the shank 2 of a clamping member 3, and mounted in said clamping member is a tool holder forming the subject matter of this application.

The tool holder is best illustrated in Figs. 2 to 5, inclusive. It consists of a tubular cylindrical-shaped housing 4 of suitable length, through which extends a second tubular member 5. This last named tubular member is provided with an annular exterior shoulder 6 and an internal shoulder 7 is formed within the housing; the housing being bored out to form the shoulder and to provide an annular space for the reception of a spring 8, the function of which will hereinafter be described.

One end of the tubular member 5 is threaded, as at 9, to receive a nut 10 which functions as a stop member. The opposite end of the tube 5 is provided with a pair of lugs 11 which carry a clamping screw 12; the tube being split between the lugs to permit a clamping action when a boring or threading bar 14 is inserted.

There are two clamps on the tool holder. First the one just described, which secures the boring bar 14 within the tube 5, and a second clamp indicated at 15. This clamp forms a part of the housing 4. It consists of a pair of lugs 16 forming part of the housing. These lugs carry a clamping screw 17. The housing is milled or cut away between the lugs to permit a clamping action and also to provide sufficient space for the insertion of key 18, which extends into a keyway 19 formed on the outer face of the tube 5. In addition to the keyway, the tube 5 carries a pin 20 on which is journaled a cone-shaped roller 21, the pin being disposed on an angle so that one face of the roller will be at right angles to the axis of the boring bar 14.

In the operation of the tool holder as a whole, tube 5 functions as the actual tool holder as the boring bar 14, together with the cutting tool carried thereby, is secured in the tube by means of the clamp 11. The housing 4 merely functions as a guide and support for the tube and the clamp 3 as a means for securing the housing to the tool post.

The tool holder is applicable for general lathe work, being particularly useful where the cut to be made is a predetermined length and where damage may result either to the tool or the work, if the carriage feed is not stopped at the proper moment. One operation of the tool holder is clearly shown in Fig. 6, where an internal thread is to be cut and the carriage feed must under ordinary conditions be stopped the moment the threading tool reaches the inner end, as further advance of the tool would cause breaking of the cutting tool and in many instances damage to the work. This is avoided in the present instance by use of the tool holder here disclosed, as the moment the threading tool reaches the inner end of the thread it can advance no further as the stop roller 21 will engage the outer end of the work, indicated at 25, and if the carriage feed is not disconnected the housing 4 will merely advance with the carriage against the compression of the spring 8. It is due to the relative movement provided between the tube 5 and the housing 4 that damage is avoided and it is also due to this relative movement that a visible indication or warning may be given; that is, the moment that the operator sees that the housing 4 starts to move longitudinally on the tube 5 in a direction toward the work, he will know that the cutter or threading tool has completed its cut and he will, accordingly, disconnect the carriage feed and retract the tool.

With the tool holder of the type here shown, it is also possible to set it for any given cut, this being accomplished by loosening the clamp 11 and pushing the boring bar inwardly until it stops, see Fig. 6. The carriage is then advanced until the stop roller 21 engages the end of the work 25 when the clamp 11 is tightened. The operation from then on will be as described. The spring 8 employed is of a rigid character so that there will be no give or chatter when the tool is performing its work, but it is sufficiently resilient to permit relative movement of the tool holder or tool 5 with relation to the housing 4 when the tool bottom reaches the end of its cut.

The tube or tool holder 5 must be secured against rotation within the housing 4 and this is the reason for the keyway 18 and the key 19. This key, by the way, is provided with a tapered face on one side as clearly shown in Fig. 3. The upper end of the key has an elongated slot formed in it through which the clamping screw 17 passes; hence if any wear takes place clamping screw 17 can be slightly loosened and the key forced inwardly into the keyway until all play is taken up. Hence, the tool holder or tube 5 is secured against rotation, vibration, or play but movement of the tube with relation to the housing is permitted.

It should also be noted that the parallel face of the stop roller 21 projects slightly beyond the end of the tube 5. This is also important as it never allows the face of the holder to be in contact with the work, thereby the face of the work is never injured.

While this and other features have been more or less specifically described and illustrated, I wish it understood that various changes may be resorted to within the scope of the appended claims. Similarly, that the materials and finish of the several parts employed may be such as the manufacturer may decide, or varying conditions or uses may demand.

Having thus described my invention, what I claim and desire to secure by Letters Patent is:—

1. A device of the character described comprising a housing, a tubular tool holder extending longitudinally through the housing and movable therein, a stop member limiting movement of the tool holder with relation to the housing in one direction, a spring interposed between the tubular tool holder and the housing and normally maintaining the stop member in engagement with the housing but permitting movement of the tubular tool holder in the opposite direction, a roller journaled on one end of the tool holder and functioning as a stop member to limit movement of the tool holder and a clamping member on the tubular tool holder to secure a cutting bar which extends therethrough.

2. A device of the character described comprising a housing, a tubular tool holder extending longitudinally through the housing and movable therein, a stop member limiting movement of the tool holder with relation to the housing in one direction, a spring interposed between the tubular tool holder and the housing and normally maintaining the stop member in engagement with the housing but permitting movement of the tubular tool holder in the opposite direction, a roller journaled on one end of the tool holder and functioning as a stop member to limit movement of the tool holder, means securing the tubular tool holder against rotation with relation to the housing and a clamping member on the tubular tool holder to secure a cutting bar which extends therethrough.

ARMAND JASMIN.